(12) United States Patent
Song et al.

(10) Patent No.: US 9,157,390 B2
(45) Date of Patent: Oct. 13, 2015

(54) SELECTIVE EXHAUST GAS RECIRCULATION DIAGNOSTIC SYSTEMS AND METHODS

(75) Inventors: B. Jerry Song, Novi, MI (US); Vijay Ramappan, Novi, MI (US); Darrell W. Burleigh, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 383 days.

(21) Appl. No.: 13/238,460

(22) Filed: Sep. 21, 2011

(65) Prior Publication Data

US 2013/0073179 A1    Mar. 21, 2013

(51) Int. Cl.
*F02D 41/00* (2006.01)
*F02D 41/14* (2006.01)
*F02M 25/07* (2006.01)

(52) U.S. Cl.
CPC .......... *F02D 41/0072* (2013.01); *F02D 41/144* (2013.01); *F02M 25/0702* (2013.01); *Y02T 10/47* (2013.01)

(58) Field of Classification Search
CPC ................ Y02T 10/47; F02D 41/0072; F02D 2200/0406; F02M 25/0777; F02M 25/0754; F02M 25/0756; F02M 25/0702
USPC .......... 123/568.11, 568.16, 568.21, 531, 585, 123/672, 681, 687, 690, 698; 701/31.8, 701/102, 108, 109
See application file for complete search history.

(56) References Cited

U.S. PATENT DOCUMENTS

| 4,081,725 | A | * | 3/1978  | Schmidt et al. ............... 318/139 |
| 4,790,286 | A |   | 12/1988 | Nishida et al.                         |
| 4,836,174 | A |   | 6/1989  | Chujo et al.                           |
| 4,905,654 | A |   | 3/1990  | Katsuno et al.                         |
| 4,942,860 | A |   | 7/1990  | Chujo et al.                           |
| 4,990,235 | A |   | 2/1991  | Chujo                                  |
| 5,034,112 | A |   | 7/1991  | Murase et al.                          |
| 5,190,017 | A | * | 3/1993  | Cullen et al. .................. 123/676 |
| 5,205,260 | A |   | 4/1993  | Takahashi et al.                       |
| 5,207,093 | A | * | 5/1993  | Maeda ....................... 73/114.74 |
| 5,465,617 | A |   | 11/1995 | Dudek et al.                           |

(Continued)

FOREIGN PATENT DOCUMENTS

| CN | 101988432 A | 3/2011  |
| CN | 202510230 U | 10/2012 |

(Continued)

OTHER PUBLICATIONS

U.S. Appl. No. 13/490,821, filed Jun. 7, 2012, Wiggins et al.

(Continued)

*Primary Examiner* — Erick Solis
*Assistant Examiner* — Carl Staubach (57) ABSTRACT

A system for a vehicle includes a first exhaust gas flow rate (EGF) estimation module, a second EGF estimation module, and an EGF fault detection module. The first EGF estimation module estimates a first flow rate of exhaust re-circulated back to an intake manifold based on a concentration of oxygen in the intake manifold. The second EGF estimation module estimates a second flow rate of exhaust re-circulated back to the intake manifold based on an engine speed and an engine load. The EGF fault detection module selectively indicates a fault is present in an exhaust gas recirculation (EGR) system based on the first flow rate and the second flow rate.

10 Claims, 7 Drawing Sheets

(56) References Cited

U.S. PATENT DOCUMENTS

| | | | |
|---|---|---|---|
| 5,617,337 A | 4/1997 | Eidler et al. | |
| 5,639,961 A * | 6/1997 | Lautenschutz | 73/114.74 |
| 6,000,385 A | 12/1999 | Fukuma | |
| 6,029,451 A | 2/2000 | Gartner | |
| 6,164,270 A | 12/2000 | Bidner et al. | |
| 6,240,365 B1 | 5/2001 | Bunn | |
| 6,309,534 B1 | 10/2001 | Fray et al. | |
| 6,311,679 B1 | 11/2001 | Druzhinina et al. | |
| 6,405,106 B1 | 6/2002 | Sheth et al. | |
| 6,575,148 B1 | 6/2003 | Bhargava et al. | |
| 6,581,370 B2 | 6/2003 | Sato et al. | |
| 6,711,892 B2 | 3/2004 | Tamura et al. | |
| 6,732,031 B1 | 5/2004 | Lightner et al. | |
| 6,738,697 B2 | 5/2004 | Breed | |
| 6,739,177 B2 | 5/2004 | Sato et al. | |
| 6,772,586 B2 | 8/2004 | Miyahara et al. | |
| 6,802,302 B1 | 10/2004 | Li et al. | |
| 6,817,197 B1 | 11/2004 | Padfield | |
| 7,104,259 B2 * | 9/2006 | Terada | 123/568.16 |
| 7,155,332 B2 | 12/2006 | Yamada et al. | |
| 7,195,009 B2 | 3/2007 | Cullen | |
| 7,261,098 B2 | 8/2007 | Vigild et al. | |
| 7,267,117 B2 | 9/2007 | Tonetti et al. | |
| 7,318,409 B2 | 1/2008 | Cullen | |
| 7,398,775 B2 | 7/2008 | Cullen | |
| 7,400,967 B2 | 7/2008 | Ueno et al. | |
| 7,409,275 B2 | 8/2008 | Sakurai et al. | |
| 7,463,960 B2 | 12/2008 | Thiel et al. | |
| 7,526,950 B2 * | 5/2009 | Van Nieuwstadt et al. | 73/114.75 |
| 7,532,963 B1 | 5/2009 | Lowrey et al. | |
| 7,565,901 B2 * | 7/2009 | Furuta et al. | 123/568.16 |
| 7,620,490 B2 | 11/2009 | Matsunaga | |
| 7,650,211 B2 | 1/2010 | Wang et al. | |
| 7,654,253 B2 | 2/2010 | Cullen | |
| 7,715,976 B1 | 5/2010 | Xiao et al. | |
| 7,974,749 B2 * | 7/2011 | Zettel et al. | 701/33.5 |
| 8,042,528 B2 * | 10/2011 | Gates et al. | 123/568.21 |
| 8,315,759 B2 | 11/2012 | Bauerle | |
| 8,521,354 B2 * | 8/2013 | Sasaki | 701/29.1 |
| 8,733,081 B2 * | 5/2014 | Miyashita | 60/278 |
| 2002/0066442 A1 | 6/2002 | Muller et al. | |
| 2002/0139360 A1 | 10/2002 | Sato et al. | |
| 2003/0106367 A1 * | 6/2003 | Osaki et al. | 73/118.2 |
| 2003/0115854 A1 | 6/2003 | Tamura et al. | |
| 2003/0159521 A1 | 8/2003 | Sarholz et al. | |
| 2004/0061290 A1 | 4/2004 | Gray | |
| 2004/0079332 A1 | 4/2004 | Kotwicki | |
| 2004/0230345 A1 | 11/2004 | Tzamaloukas | |
| 2005/0072411 A1 | 4/2005 | Cullen | |
| 2005/0131620 A1 | 6/2005 | Bowyer | |
| 2005/0139193 A1 | 6/2005 | Kobayashi et al. | |
| 2005/0161029 A1 * | 7/2005 | Ishikawa | 123/568.16 |
| 2005/0274369 A1 | 12/2005 | Tonetti et al. | |
| 2006/0048760 A1 | 3/2006 | Matsunaga et al. | |
| 2006/0064228 A1 | 3/2006 | Huang | |
| 2006/0213490 A1 | 9/2006 | Vigild et al. | |
| 2007/0005609 A1 | 1/2007 | Breed | |
| 2007/0062499 A1 * | 3/2007 | Miyasako et al. | 123/568.16 |
| 2007/0100519 A1 | 5/2007 | Engel | |
| 2007/0174003 A1 | 7/2007 | Ueno et al. | |
| 2007/0181111 A1 | 8/2007 | Cullen | |
| 2008/0178853 A1 * | 7/2008 | Yamaoka et al. | 123/568.11 |
| 2008/0189009 A1 | 8/2008 | Wang et al. | |
| 2008/0270012 A1 | 10/2008 | Cullen | |
| 2008/0316006 A1 | 12/2008 | Bauman et al. | |
| 2009/0038308 A1 | 2/2009 | Nagae | |
| 2009/0132153 A1 | 5/2009 | Shutty et al. | |
| 2009/0254245 A1 | 10/2009 | Bauerle | |
| 2010/0042284 A1 * | 2/2010 | Sasaki | 701/29 |
| 2010/0224174 A1 | 9/2010 | Tabata | |
| 2011/0011378 A1 * | 1/2011 | Nakamura | 123/568.16 |
| 2011/0023847 A1 | 2/2011 | Gates et al. | |
| 2011/0054762 A1 | 3/2011 | Nakayama et al. | |
| 2011/0072793 A1 | 3/2011 | Bidner et al. | |
| 2011/0077838 A1 | 3/2011 | Osburn et al. | |
| 2011/0191010 A1 | 8/2011 | Russ et al. | |
| 2012/0046854 A1 | 2/2012 | Sangkyu et al. | |
| 2012/0116648 A1 | 5/2012 | Russ et al. | |
| 2012/0227714 A1 | 9/2012 | Surnilla et al. | |
| 2012/0227719 A1 | 9/2012 | Surnilla et al. | |
| 2012/0303346 A1 | 11/2012 | Takezoe et al. | |
| 2013/0054122 A1 | 2/2013 | Aoyagi | |
| 2013/0226435 A1 | 8/2013 | Wasberg et al. | |
| 2013/0238218 A1 | 9/2013 | Wiggins et al. | |
| 2013/0253798 A1 | 9/2013 | Ramappan et al. | |
| 2013/0268176 A1 | 10/2013 | Song et al. | |
| 2013/0332050 A1 | 12/2013 | Song et al. | |
| 2014/0149015 A1 | 5/2014 | Pursifull | |

FOREIGN PATENT DOCUMENTS

| | | | | |
|---|---|---|---|---|
| JP | 63140856 A | | 6/1988 | |
| JP | 63159664 A | | 7/1988 | |
| JP | 405118246 A | * | 5/1993 | 123/568.29 |
| JP | 2003148258 A | | 5/2003 | |
| JP | 2006029084 A | | 2/2006 | |
| JP | 2008-087480 | * | 3/2008 | F02M 25/07 |
| JP | 2008248888 A | | 10/2008 | |
| JP | 2009243283 A | | 10/2009 | |
| JP | 2009287491 A | | 12/2009 | |
| JP | 2010203281 A | | 9/2010 | |
| WO | WO 2009/118605 | * | 10/2009 | F02M 25/07 |

OTHER PUBLICATIONS

U.S. Appl. No. 13/490,885, filed Jun. 7, 2012 Song et al.
U.S. Appl. No. 13/425,723, Ramappan et al., Mar. 21, 2012.
U.S. Appl. No. 13/408,577, Wasberg et al., Feb. 29, 2012.
U.S. Appl. No. 13/440,570, Song et al. Apr. 5, 2012.
U.S. Appl. No. 13/786,944, Mar. 6, 2013, Naik et al.
U.S. Appl. No. 13/967,591, Aug. 15, 2013, Song.
U.S. Appl. No. 13/967,660, Aug. 15, 2013, Song.

* cited by examiner

SELECTIVE EXHAUST GAS RECIRCULATION DIAGNOSTIC SYSTEMS AND METHODS

FIELD

The present disclosure relates to internal combustion engines and, more specifically, to engine exhaust gas recirculation diagnostic systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine combusts air and fuel to generate torque. Air flows into the engine through an air induction system. Fuel is provided by one or more fuel injectors. Exhaust resulting from combustion is expelled from the engine to an exhaust system. A mass air flow (MAF) sensor measures a mass flow rate of air into the air induction system.

An exhaust gas recirculation (EGR) system re-circulates exhaust back to the air induction system. For exhaust to flow back to the air induction system, a pressure within the exhaust system must be greater than a pressure within the air induction system. The EGR system maybe controlled to provide a target mixture of exhaust, air, and fuel to each cylinder. The engine may not operate as intended when the target mix is not maintained. Additionally, the presence of a fault in the EGR system may need to be identified, for example, for an on-board diagnostic (OBD) reason and/or one or more other suitable reasons.

SUMMARY

A system for a vehicle includes a first exhaust gas flow rate (EGF) estimation module, a second EGF estimation module, and an EGF fault detection module. The first EGF estimation module estimates a first flow rate of exhaust re-circulated back to an intake manifold based on a concentration of oxygen in the intake manifold. The second EGF estimation module estimates a second flow rate of exhaust re-circulated back to the intake manifold based on an engine speed and an engine load. The EGF fault detection module selectively indicates a fault is present in an exhaust gas recirculation (EGR) system based on the first flow rate and the second flow rate.

In other features, a system for a vehicle includes a first exhaust gas flow rate (EGF) estimation module and an EGF fault detection module. The first EGF estimation module estimates a first flow rate of exhaust re-circulated back to an intake manifold based on a concentration of oxygen in the intake manifold. The EGF fault detection module selectively indicates that a leak is present in an exhaust gas recirculation (EGR) valve based on the first flow rate.

A method includes: estimating a first flow rate of exhaust re-circulated back to an intake manifold based on a concentration of oxygen in the intake manifold; estimating a second flow rate of exhaust re-circulated back to the intake manifold based on an engine speed and an engine load; and selectively indicating that a fault is present in an exhaust gas recirculation (EGR) system based on the first flow rate and the second flow rate.

In other features, a method includes: estimating a first flow rate of exhaust re-circulated back to an intake manifold based on a concentration of oxygen in the intake manifold; and selectively indicating that a leak is present in an exhaust gas recirculation (EGR) valve based on the first flow rate.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

An exhaust gas recirculation (EGR) system re-circulates exhaust back to an intake manifold. The EGR system may be controlled based on re-circulating a target amount of exhaust back to the intake manifold. Under some circumstances, however, the EGR system may re-circulate an amount of exhaust that is more or less than the target amount back to the intake manifold. For example only, the EGR system may re-circulate more or less exhaust back to the intake manifold when an EGR fault is present. The EGR fault may be caused by, but not limited to, a faulty intake oxygen sensor, a faulty exhaust oxygen sensor, a faulty engine speed sensor, an EGR valve opening differently than intended, and pulsating exhaust flow.

An ECM may estimate a first amount of exhaust delivered to the intake manifold using measurements from an intake oxygen sensor, an exhaust oxygen sensor, and a mass air flow (MAF) sensor. The ECM may estimate a second amount of exhaust delivered to the intake manifold using an engine speed, an engine load, and an opening of the EGR valve. The ECM compares the first and second amounts. The ECM selectively indicates whether the EGR fault is present based on the first and second amounts.

Figure 1:
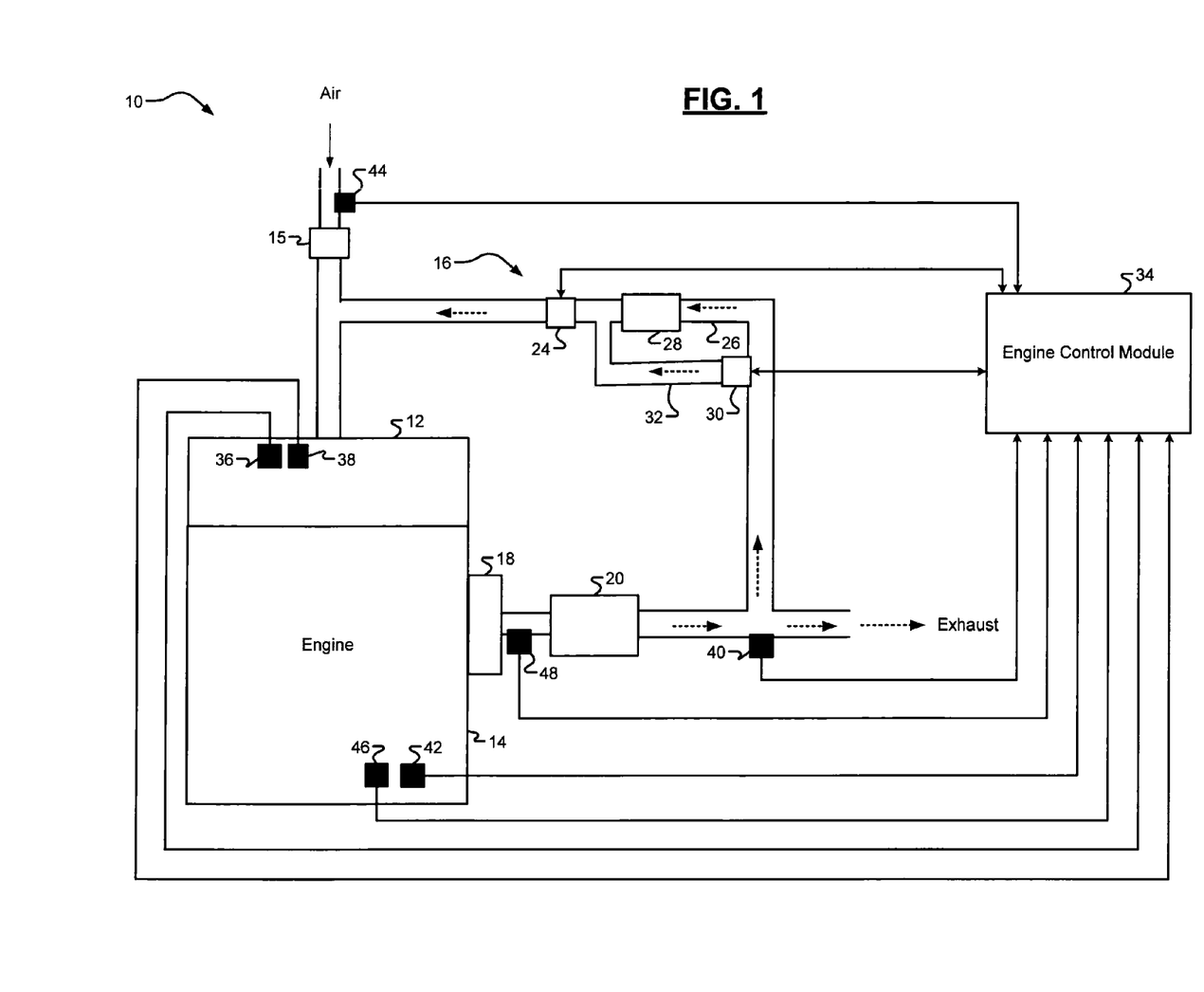
FIG. 1 is a functional block diagram of an example of an engine system according to the present disclosure.

Referring now to FIG. 1, a functional block diagram of an example of an engine system 10 is presented. The present disclosure is applicable to other types of engine systems. The engine system 10 includes an intake manifold 12, an engine 14, and an EGR system 16.

Air may be drawn through a throttle 15 into the intake manifold 12. The engine 14 combusts an air/fuel mixture within cylinders to drive a crankshaft. The engine 14 outputs exhaust to an exhaust manifold 18. A catalyst 20 receives exhaust from the exhaust manifold 18 and reacts with various components of the exhaust. For example only, the catalyst 20 may include a three-way catalyst (TWC), a catalytic converter, or another suitable exhaust catalyst.

The EGR system 16 may re-circulate a portion of the exhaust back to the intake manifold 12. The EGR system 16 may include an EGR valve 24 and an EGR conduit 26. The EGR system 16 may further include an EGR cooler 28, an EGR bypass valve 30, and an EGR bypass conduit 32. The EGR cooler 28, the EGR bypass valve 30, and the EGR bypass conduit 32 may be excluded from the EGR system 16 in various implantations.

Opening the EGR valve 24 allows exhaust to be drawn through the EGR cooler 28 via the EGR conduit 26. Opening the EGR bypass valve 30 while the EGR valve 24 is open allows exhaust to bypass the EGR cooler 28 via the EGR bypass conduit 32. Opening of the EGR valve 24 and the EGR bypass valve 30 may be coordinated, for example, to re-circulate a desired mixture of cooled exhaust (via the EGR conduit 26) and non-cooled exhaust (via the EGR bypass conduit 32) back to the intake manifold 12.

An engine control module (ECM) 34 regulates operation of the engine system 10. The ECM 34 communicates with a manifold absolute pressure (MAP) sensor 36, an intake oxygen (IO) sensor 38, and an exhaust oxygen (EO) sensor 40. The ECM 34 also communicates with an engine speed (RPM) sensor 42, a mass air flow (MAF) sensor 44, an engine coolant temperature sensor 46, and an exhaust temperature sensor 48.

The MAP sensor 36 generates a MAP signal indicating an absolute pressure in the intake manifold 12. The RPM sensor 42 generates a RPM signal indicating RPM. The IO sensor 38 generates an IO signal indicating an amount of oxygen (e.g., concentration) present in the intake manifold 12. The amount of oxygen present in the intake manifold 12 will be referred to as an intake oxygen amount. The EO sensor 40 generates an EO signal indicating an amount of oxygen (e.g., concentration) present in the exhaust. The amount of oxygen present in the exhaust will be referred to as an exhaust oxygen amount. While the EO sensor 40 is illustrated as being located downstream of the catalyst 20, the EO sensor 40 may be located upstream of the catalyst 20. The engine coolant temperature sensor 46 generates a coolant temperature signal indicating engine coolant temperature. The exhaust temperature sensor 48 generates an exhaust temperature signal indicating the exhaust temperature prior to the EGR exhaust flowing through the EGR cooler 28 and/or other treatment devices (not shown).

The MAF sensor 44 generates a MAF signal indicating mass flow rate of air into the intake manifold 12. The ECM 34 determines an engine load. For example only, the ECM 34 may determine the engine load based on an engine output torque and/or a fueling rate of the engine 14. The fueling rate may be, for example, an amount (e.g., volume or mass) of fuel per combustion event.

The ECM 34 determines an operational status of the EGR system 16 based on the engine load, the RPM, the intake oxygen amount, and the exhaust oxygen amount. The operational status may indicate whether the EGR system 16 has the EGR fault. The ECM 34 varies an opening of the EGR valve 24 based on a desired amount of EGR. For example, the ECM 34 may increase the amount (e.g., flow rate) of EGR going back to the intake manifold 12 by increasing the opening of the EGR valve 24, and vice versa.

Figure 2:
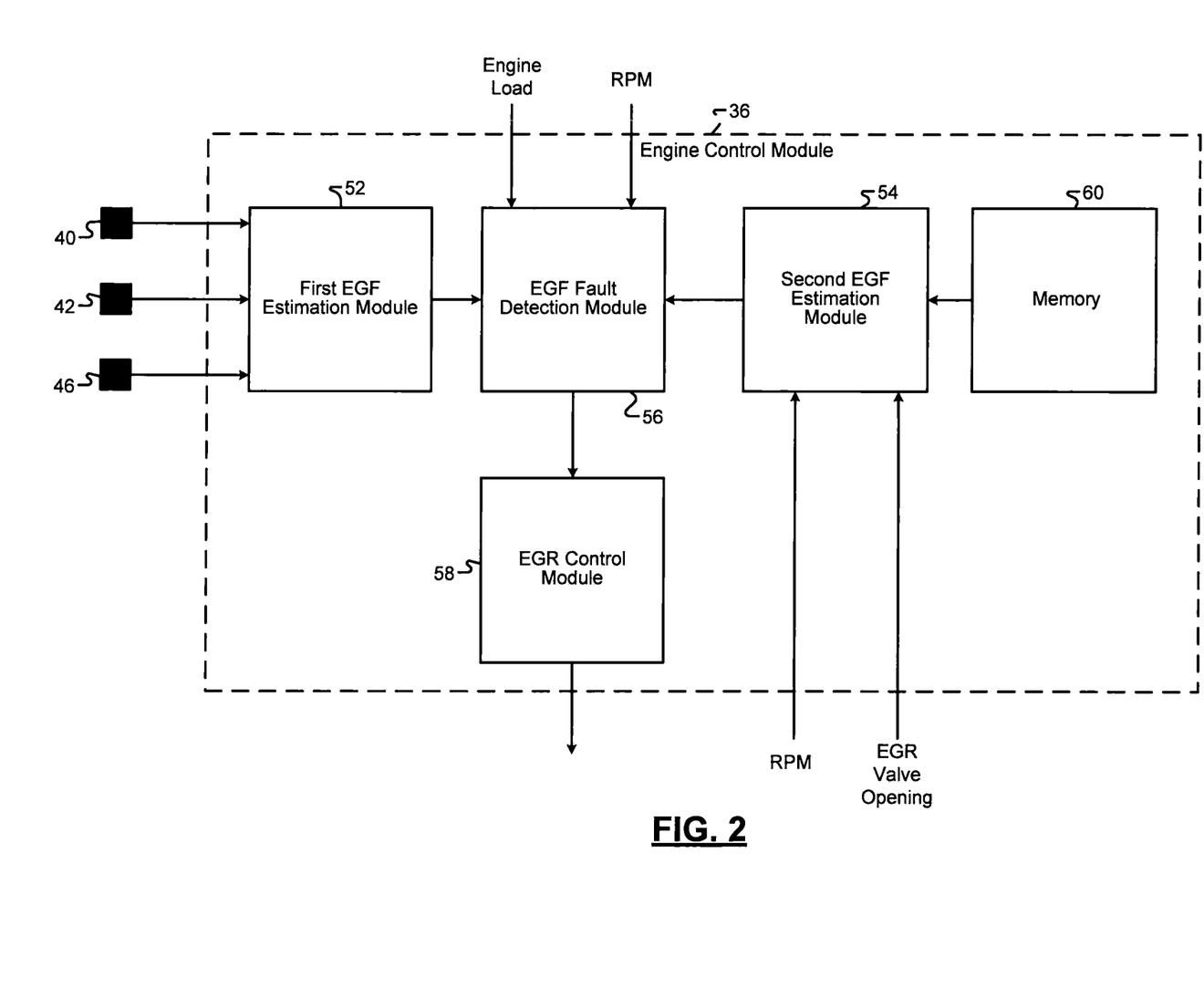
FIG. 2 is a functional block diagram of an example of an engine control module according to the present disclosure.

Referring now to FIG. 2, a functional block diagram of an example of the ECM 34 is presented. The ECM 34 includes a first exhaust gas flow rate (EGF) estimation module 52, a second EGF estimation module 54, an EGF fault detection module 56, an EGR control module 58, and memory 60.

The first EGF estimation module 52 generates a first EGF. The first EGF refers to a first detected flow rate of EGR back to the intake manifold 12. The first EGF estimation module 52 calculates the first EGF based on the intake oxygen amount, the exhaust oxygen amount, and the MAF. For example only, the first EGF may be calculated using equations (1) and (2):

$$r = \frac{20.9 - O_2 \% \ IO}{20.9 - O_2 \% \ EO} \quad (1)$$

$$EGF_1 = \frac{r}{1-r} \dot{m}_{MAF}, \quad (2)$$

where r is a ratio, $O_2\%$ IO is the intake oxygen amount, $O_2\%$ EO is the exhaust oxygen amount, $\dot{m}_{MAF}$ is the MAF, and $EGF_1$ is the first EGF.

The second EGF estimation module 54 generates a second EGF based on the RPM, the opening of the EGR valve 24, and the engine load. The second EGF refers to a second detected flow rate of EGR back to the intake manifold 12. The engine load is a load on the engine 14 and may be determined, for example, based on an engine torque output and a fueling rate. The opening of the EGR valve 24 may be, for example only, measured using a sensor or obtained in another suitable manner. The second EGF estimation module 54 may generate the second EGF using a function and/or a mapping that relates the RPM, the engine load, and the opening of the EGR valve 24 to the second EGF. The mapping may be stored in the memory 60.

Figure 3:
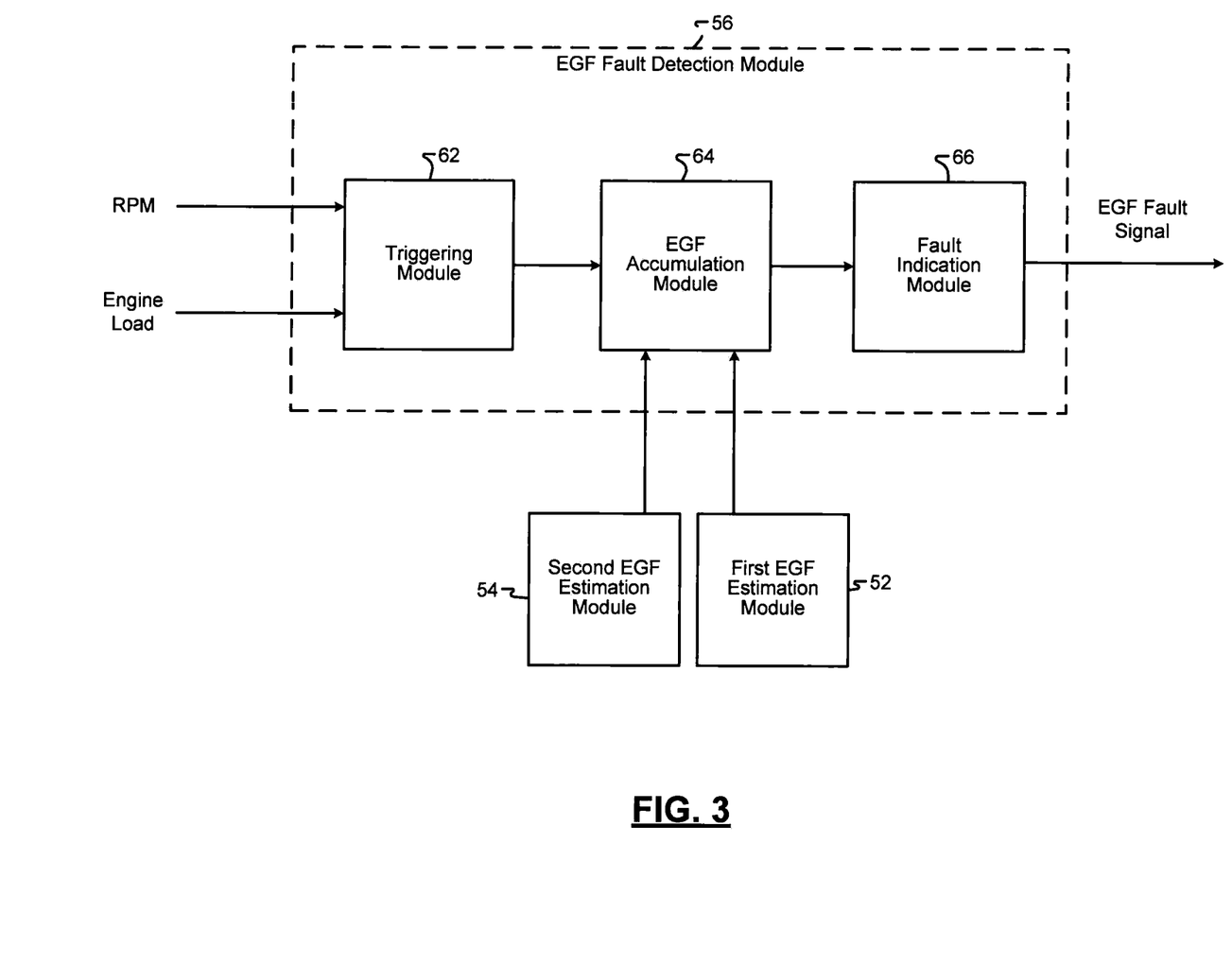
FIG. 3 is a functional block diagram of an example of an exhaust gas flow rate (EGF) fault detection module according to the present disclosure.

The EGF fault detection module 56 determines whether an EGR fault is present based on the first EGF and the second EGF. Referring now to FIG. 3, a functional block diagram of an example of the EGF fault detection module 56 is presented. The EGF fault detection module 56 may include a triggering module 62, an EGF accumulation module 64, and a fault indication module 66.

The triggering module 62 selectively triggers or disables the EGF accumulation module 64 based on the engine load and the RPM. For example only, the triggering module 62 may trigger the EGF accumulation module 64 when, over a predetermined period, a change in the RPM is less than a predetermined RPM and a change in the engine load is less than a predetermined engine load. Conversely, the triggering module 62 may disable the EGF accumulation module 64 when the change in the RPM is greater than the predetermined RPM and/or the change in the engine load is greater than the predetermined engine load. The predetermined speed and the predetermined engine load are calibrated values. The predetermined period may be, for example only, approximately 5 seconds to 60 seconds. The predetermined speed for the predetermined period may be, for example only, approximately 1,000 revolutions per minute to 12,000 revolutions per minute. The predetermined engine load for the predetermined period may be, for example only, approximately 248 Newton-meters to 1,248 Newton-meters.

The EGF accumulation module 64 generates an accumulated EGF based on the predetermined period and the first and second EGFs. The accumulated EGF refers to the integral of the absolute value of the difference between the first EGF and the second EGF. For example only, the accumulated EGF may be calculated using equation (3):

$$EGF_A = \sum_{t=0}^{t} |EGF_1 - EGF_2|, \qquad (3)$$

where $EGF_1$ is the first EGF, $EGF_2$ is the second EGF, t is the predetermined period, and $EGF_A$ is the accumulated EGF. The triggering module 62 may disable the EGF accumulation module 64 during the predetermined period. When the EGF accumulation module 64 is disabled, the predetermined period is reset, and the accumulated EGF is reset.

The fault indication module 66 generates an EGF fault signal based on the accumulated EGF and an allowable EGF error. The EGF error status indicates whether the accumulated EGF is greater than the allowable EGF error. The allowable EGF error is a predetermined value that indicates a maximum acceptable amount of accumulated EGF. The accumulated EGF being greater than the allowable EGF indicates a fault with the EGR system 16. The fault indication module 66 determines whether the accumulated EGF is greater than the allowable EGF error. The allowable EGF error may correspond to, for example only, a 2% difference between the first EGF and the second EGF.

Referring back to FIG. 2, the EGR control module 58 controls the operation of the EGR system 16. For example, the EGR control module 58 may control the opening of the EGR bypass valve 30 and the EGR valve 24. The operation of the EGR system 16 may change based on the EGF error status. The ECM 34 may vary operation of the engine 14 and may activate a fault indicator (e.g., a check engine light) based on the EGF error status.

Figure 4:
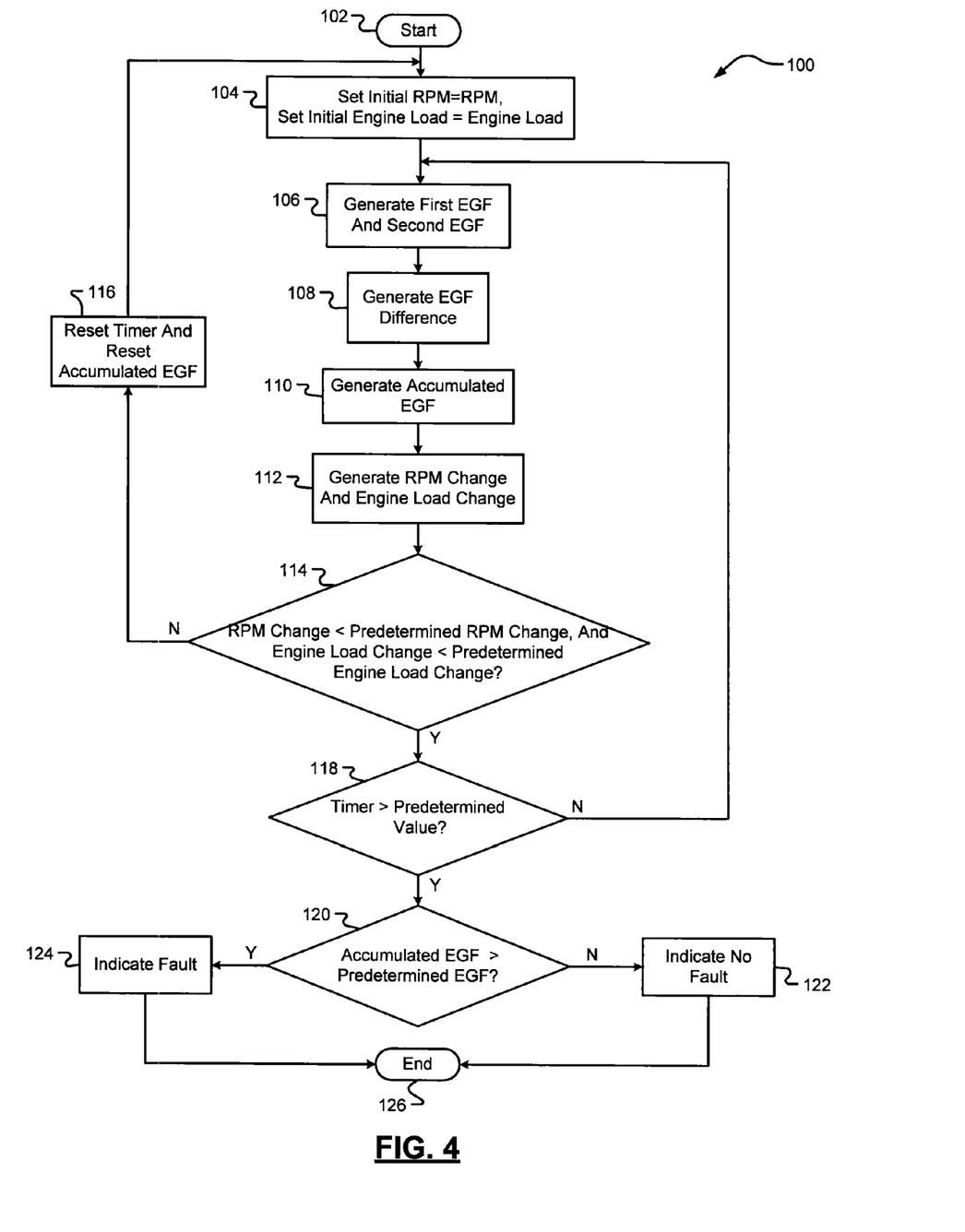
FIG. 4 is a flow diagram of an example method for determining presence of a fault of an EGR system according to the present disclosure.

Referring now to FIG. 4, a flow diagram of an example method 100 for determining presence of a fault of the EGR system 16 is presented. Control begins at 102. At 104, control sets an initial RPM to the RPM and sets an initial engine load to the engine load. At 106, control generates the first EGF and the second EGF as described above with FIG. 2. At 108, control generates an absolute EGF difference. Subtracting the first EGF and the second EGF and applying the absolute value generates the absolute EGF difference. At 110, control generates the accumulated EGF as described with FIG. 2. At 112, control generates a RPM change and an engine load change. The RPM change may be the absolute difference between the RPM and the initial RPM. The engine load change may be the absolute difference between the engine load and the initial engine load.

At 114, control determines whether the RPM change is less than a predetermined RPM change and whether the engine load change is less than a predetermined engine load change. If no, control proceeds to 116. If yes, control proceeds to 118. At 116, control resets a timer and resets the accumulated EGF. At 118, control determines whether the timer is greater than a predetermined value (corresponding to the predetermined period). If no, control proceeds back to 106. If yes, control proceeds to 120. At 120, control determines whether the accumulated EGF is greater than the allowable EGF error. If no, control proceeds to 122. If yes control proceeds to 124. At 122, control indicates that no fault is present in the EGR system 16. At 124, control indicates a fault is present in the EGR system 16. At 126, control ends.

Figure 5:
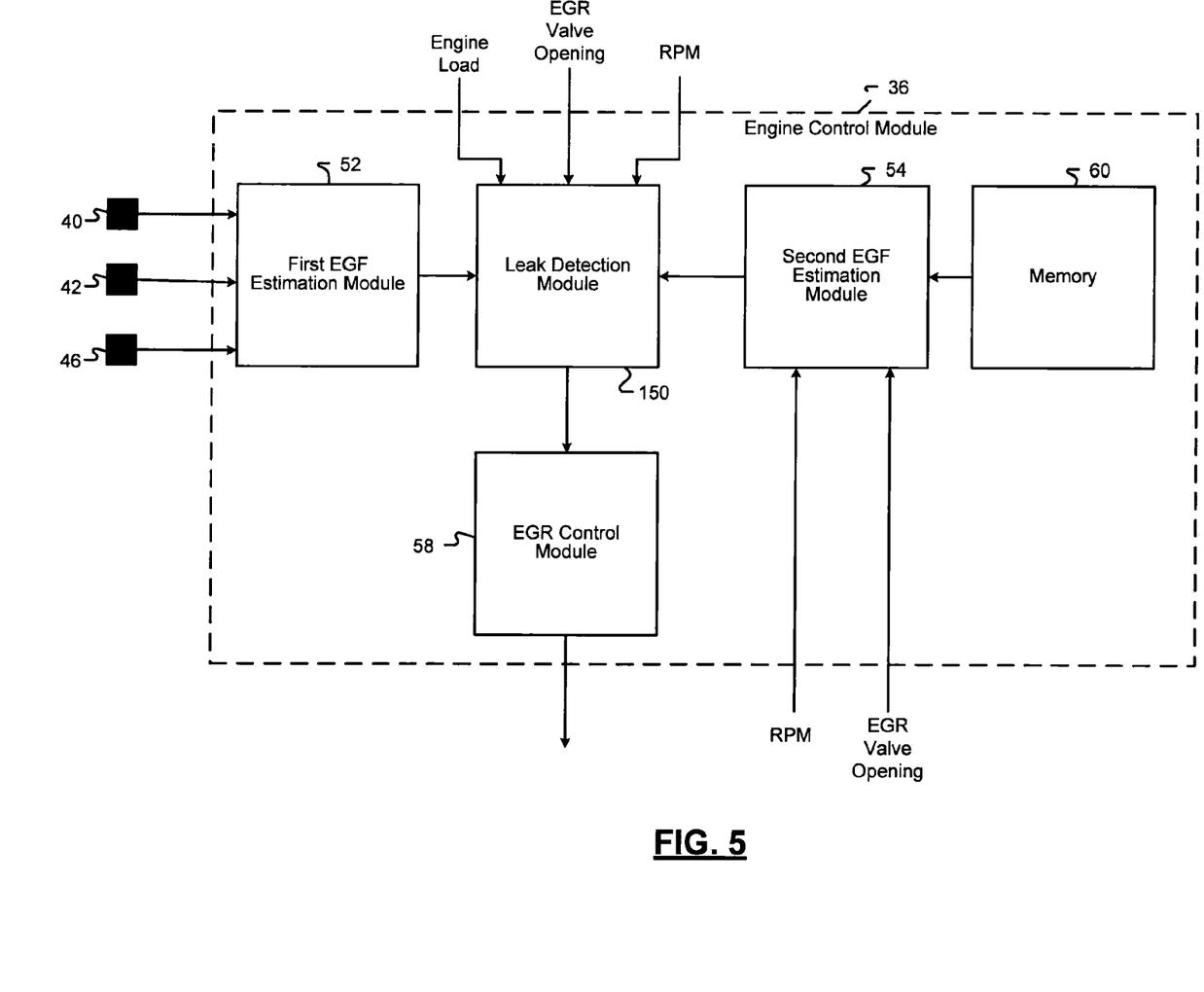
FIG. 5 is a functional block diagram of another example of the engine control module according to the present disclosure.
Figure 6:
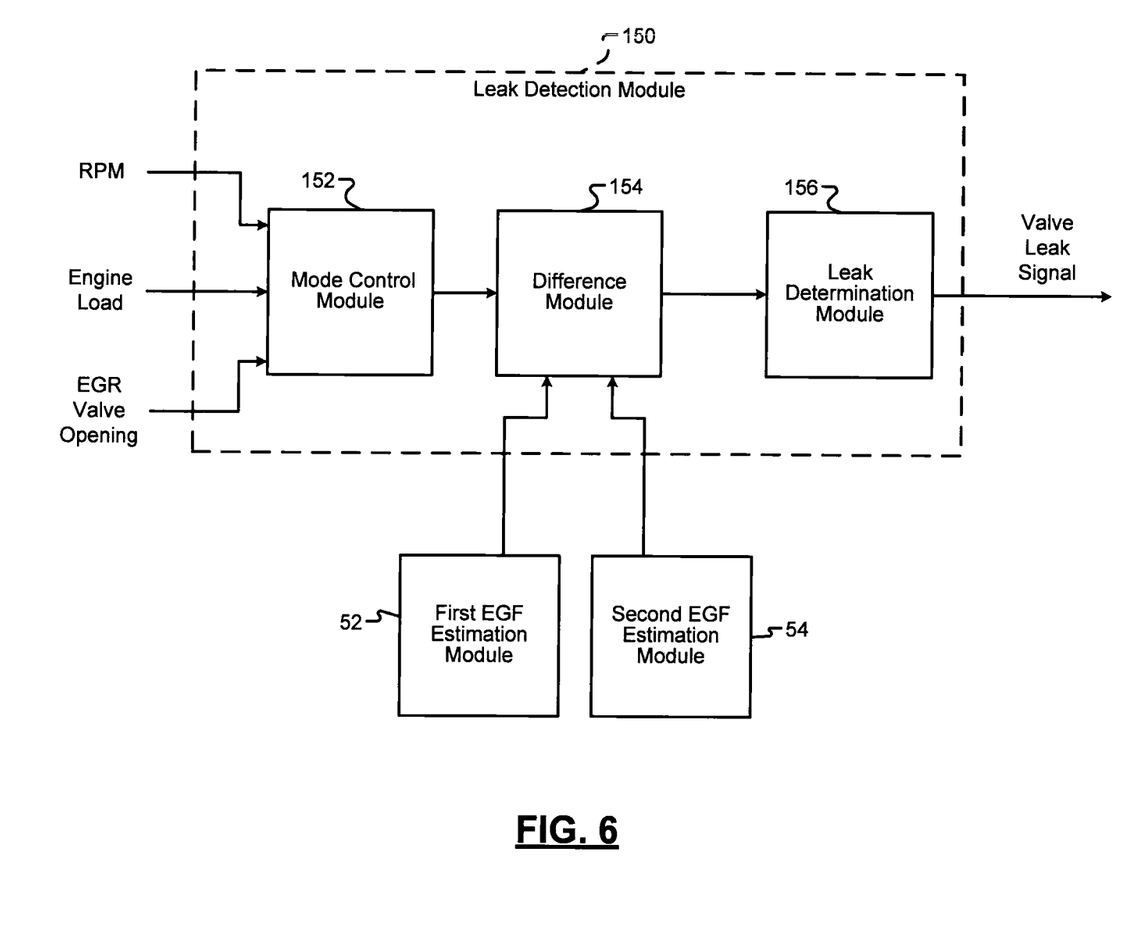
FIG. 6 is a functional block diagram of an example of a leak detection module according to the present disclosure.

Referring now to FIG. 5, a functional block diagram of another example of the ECM 34 is presented. The ECM 34 includes the first EGF estimation module 52, the second EGF estimation module 54, a leak detection module 150, the EGR control module 58, and the memory 60. The leak detection module 150 determines whether there is a leak in the EGR valve 24 based on the first EGF and the second EGF. Referring now to FIG. 6, a functional block diagram of an example of the leak detection module 150 is presented. The leak detection module 150 may include a mode control module 152, a difference module 154, and a leak determination module 156.

The mode control module 152 sets a mode based on the opening of the EGR valve 24 and a pressure across the EGR valve 24. The pressure across the EGR valve 24 may, for example, be determined based on the RPM, the engine load, and the EGR valve opening. For example only, the pressure across the EGR valve 24 may increase as the RPM increase, as the engine load decreases, and/or the EGR valve opening decreases and vice versa. The mode may be set to, for example, a first mode, a second mode, or an off mode at a given time.

The mode control module 152 may set the mode to the first mode when the EGR valve 24 is in a fully closed position and the pressure across the EGR valve is greater than a predetermined pressure. The mode control module 152 may set the mode to the second mode when the EGR valve 24 is not in the fully closed position. When the EGR valve 24 is in the fully closed position and the pressure across the EGR valve 24 is less than the predetermined pressure, the mode control module 152 may set the mode to the off mode. The predetermined pressure may be, for example only, approximately 70 kilopascals.

The difference module 154 selectively sets a difference based on the mode. The difference module 154 may set the difference based on a first difference between the first EGF and a predetermined EGF when the mode is set to the first mode. The predetermined EGF may correspond to, for example only, approximately 0% EGF. The difference module 154 may set the difference based on a second difference between the first and second EGFs when the mode is set to the second mode. The difference module 154 may be disabled and not generate the difference when the mode is set to the off mode.

The leak determination module 156 indicates whether there is a leak in the EGR valve 24 based on the difference. The leak determination module 156 compares the difference to a predetermined leak value. For example, when the difference is greater than the predetermined leak value, the leak determination module 156 may indicate that the EGR valve 24 has a leak. The predetermined leak value correspond to, for example only, 2% EGF. The leak determination module 156 may generate a valve leak signal that indicates whether the EGR valve 24 has a leak.

Referring back to FIG. 5, the EGR control module 58 controls the operation of the EGR system 16 based on the valve leak signal. For example, the EGR control module 58 may selectively increase or decrease the opening of the EGR valve 24 in response to a leak being present. The ECM 34 may, for example only, vary operation of the engine 14 and may activate a fault indicator (e.g., a check engine light) when a leak is present.

Figure 7:
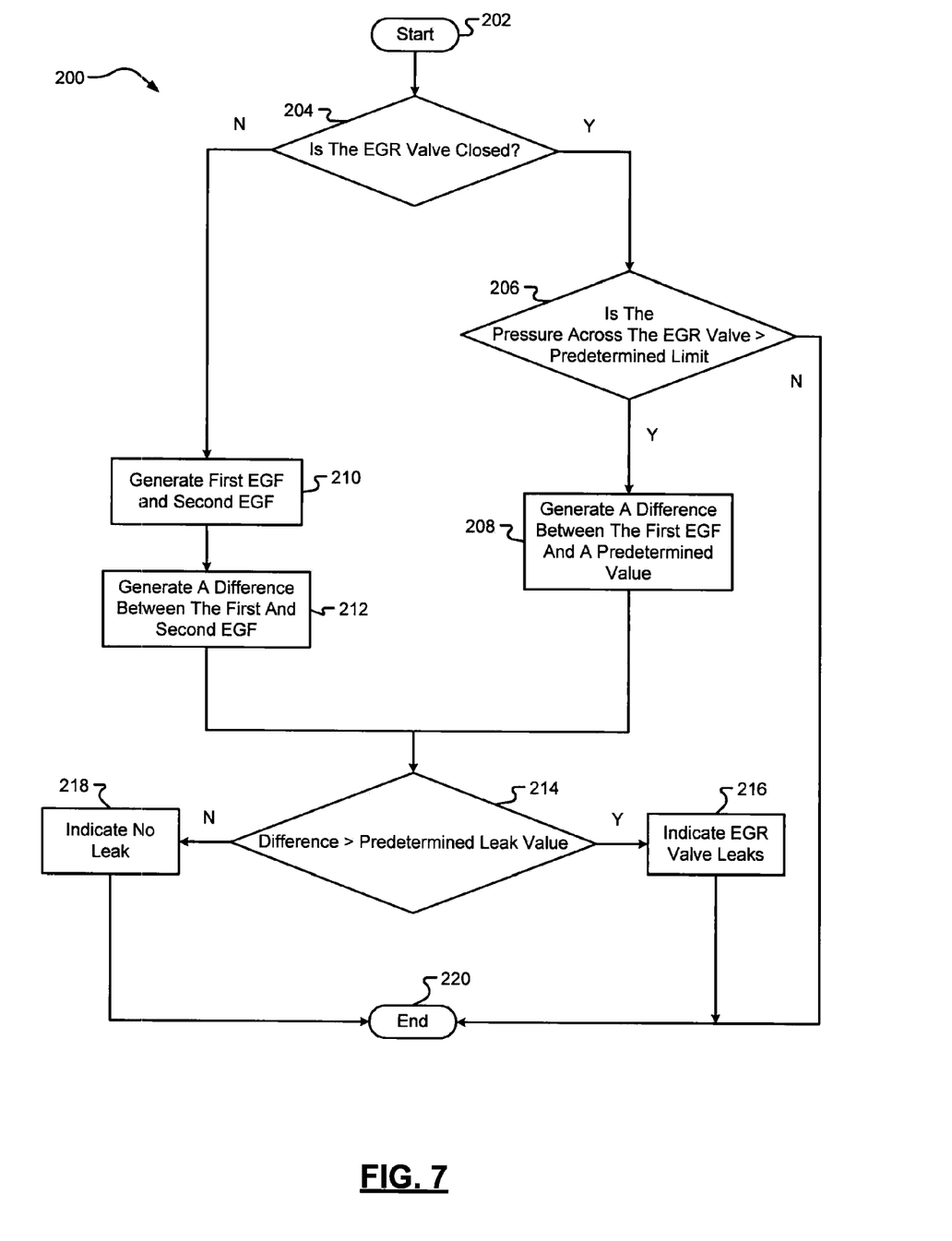
FIG. 7 is a flow diagram of an example method for determining presence of a leak of an EGR valve according to the present disclosure.

Referring now to FIG. 7, a flow diagram of an example method 200 for determining presence of a leak of an EGR valve is presented. Control begins at 202. At 204, control determines whether the EGR valve 24 is in the fully closed position. If yes, control proceeds to 206. If no, control proceeds to 210. At 206, control determines whether the pressure across the EGR valve 24 is greater than the predetermined pressure. If yes, control proceeds to 208. If no, control proceeds to 220. At 208, control generates the difference based on the first EGF and the predetermined EGF as described with FIG. 6. At 210, control generates a first and second EGFs as described with FIG. 2. At 212, control generates the difference based on the first and second EGFs as described with FIG. 6. At 214, control determines whether the difference is greater than the predetermined leak value. If yes, control proceeds to 216. If no, the control proceeds to 218. At 218, control indicates that the EGR valve leaks. At 218, the control indicates that the EGR valve does not leak. At 220, control ends.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for a vehicle, comprising:
   a first exhaust gas flow rate (EGF) estimation module that estimates a first flow rate of exhaust re-circulated back to an intake manifold based on a concentration of oxygen in the intake manifold;
   a second EGF estimation module that estimates a second flow rate of exhaust re-circulated back to the intake manifold using one of a function and a mapping that relates an engine speed, an engine load, and an opening of an exhaust gas recirculation (EGR) valve to the second flow rate;
   an EGF fault detection module that selectively indicates that a fault is present in an EGR system based on the first flow rate and the second flow rate,
   wherein, when the EGR valve is closed, the EGF fault detection module selectively indicates that a leak is present in the EGR valve based on a first difference between the first flow rate and a predetermined flow rate, and
   wherein, when the EGR valve is open, the EGF fault detection module selectively indicates that the leak is present based on a second difference between the first flow rate and the second flow rate; and
   a triggering module that disables the EGF fault detection when a change in the engine speed is greater than a predetermined speed and when a change in the engine load is greater than a predetermined load.

2. The system of claim 1 wherein the fault indicates at least one of a faulty intake oxygen (IO) sensor, a faulty exhaust oxygen (EO) sensor, a faulty engine speed sensor, the EGR valve opening differently than intended, and pulsating exhaust flow.

3. The system of claim 1 wherein
   the first EGF estimation module estimates the first flow rate of exhaust re-circulated back to the intake manifold based on the concentration of oxygen in the intake manifold measured using an intake oxygen sensor and a concentration of oxygen in an exhaust system measured using an exhaust oxygen sensor.

4. The system of claim 1 wherein the EGF fault detection module indicates that the leak is present when the first difference is greater than a predetermined value.

5. The system of claim 1 wherein the EGF fault detection module indicates that the leak is present when the second difference is greater than a predetermined value.

6. A method comprising:
   estimating a first flow rate of exhaust re-circulated back to an intake manifold based on a concentration of oxygen in the intake manifold;
   estimating a second flow rate of exhaust re-circulated back to the intake manifold using one of a function and a mapping that relates an engine speed, an engine load, and an opening of an exhaust gas recirculation (EGR) valve to the second flow rate;
   selectively indicating that a fault is present in an EGR system based on the first flow rate and the second flow rate;
   when the EGR valve is closed, selectively indicating that a leak is present in the EGR valve based on a first difference between the first flow rate and a predetermined flow rate;
   when the EGR valve is open, selectively indicating that the leak is present is based on a second difference between the first flow rate and the second flow rate; and
   disabling the indication when a change in the engine speed is greater than a predetermined speed and when a change in the engine load is greater than a predetermined load.

7. The method of claim 6 wherein the fault indicates at least one of a faulty intake oxygen (IO) sensor, a faulty exhaust oxygen (EO) sensor, a faulty engine speed sensor, the EGR valve opening differently than intended, and pulsating exhaust flow.

8. The method of claim 6 wherein
   estimating the first flow rate of exhaust re-circulated back to the intake manifold comprises estimating the first flow rate based on the concentration of oxygen in the intake manifold measured using an intake oxygen sensor and a concentration of oxygen in an exhaust system measured using an exhaust oxygen sensor.

9. The method of claim 6 further comprising indicating that the leak is present when the first difference is greater than a predetermined value.

10. The method of claim 6 further comprising indicating that the leak is present when the second difference is greater than a predetermined value.

* * * * *